Figure 3:
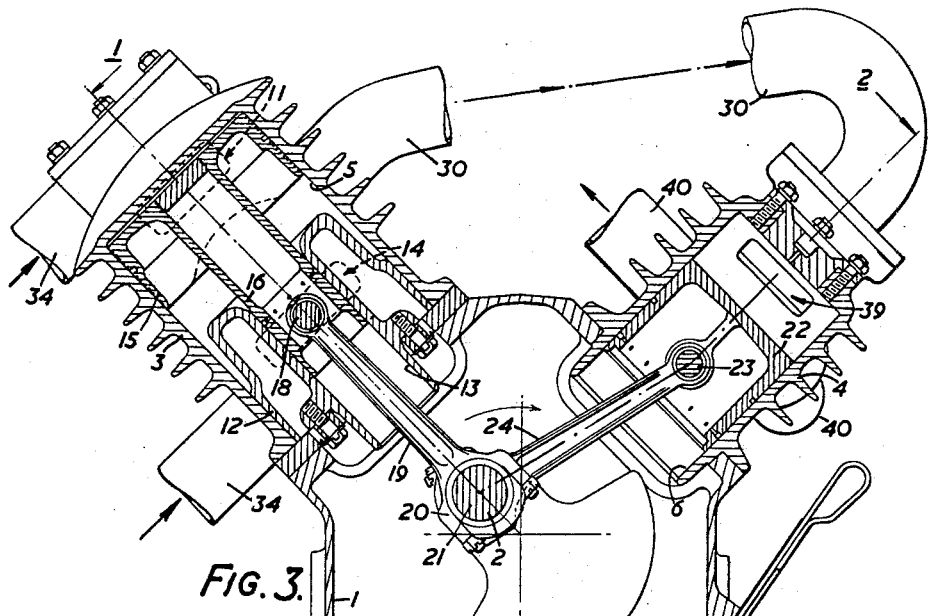

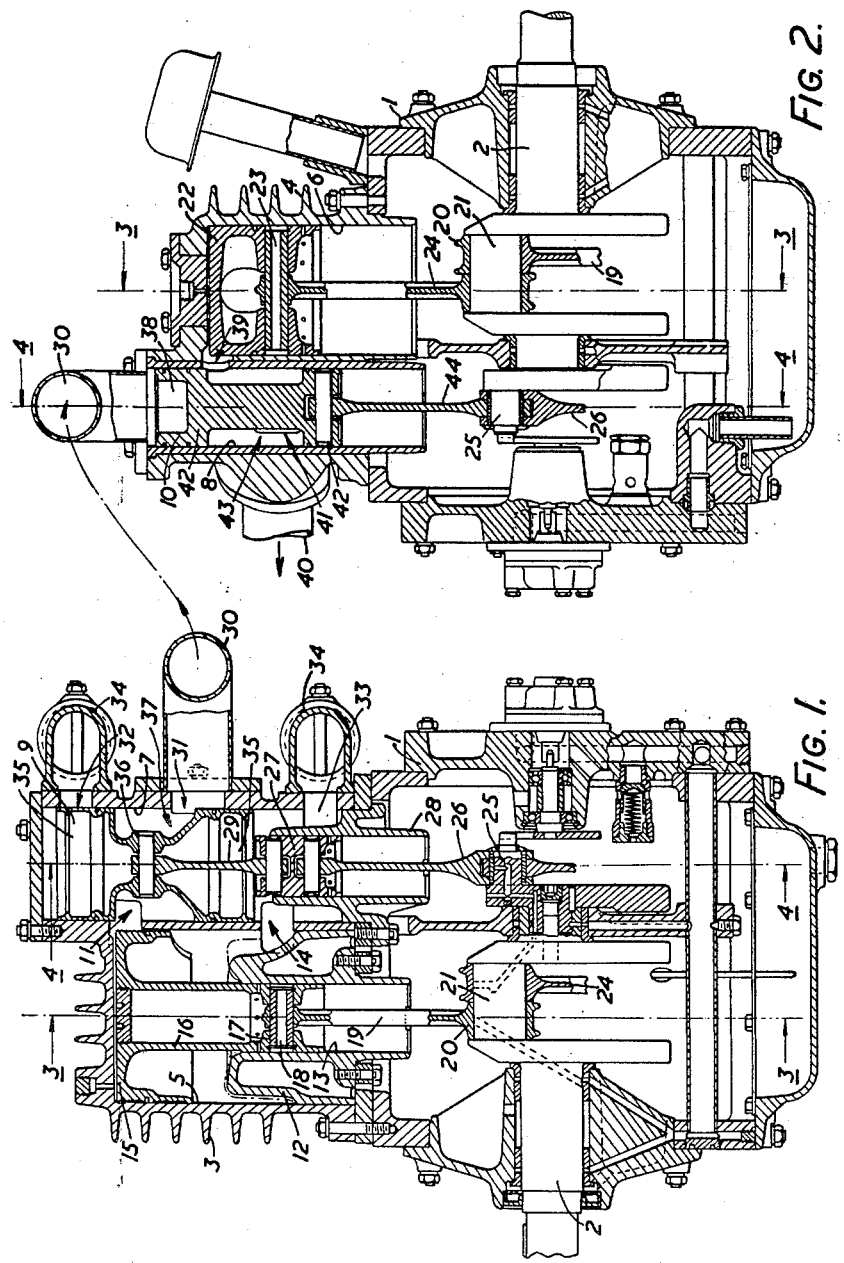

March 19, 1963  H. R. RICARDO  3,081,933
RECIPROCATING AIR COMPRESSORS
Filed Oct. 17, 1960  3 Sheets-Sheet 2

INVENTOR
HARRY R. RICARDO
BY
Watson, Cole, Grindle & Watson
ATTORNEYS

_United States Patent Office_

3,081,933
Patented Mar. 19, 1963

3,081,933
RECIPROCATING AIR COMPRESSORS
Harry Ralph Ricardo, Westminster, London, England, assignor to Ricardo & Co., Engineers Limited, London, England, a British company
Filed Oct. 17, 1960, Ser. No. 62,969
Claims priority, application Great Britain Oct. 20, 1959
9 Claims. (Cl. 230—183)

This invention relates to reciprocating air compressors, which term is to be understood as including compressors for other gases than air, and has for an object to provide a form of air compressor which will be capable of operating satisfactorily at comparatively high speeds so as to be suitable for use with a high speed internal combustion engine, especially a diesel engine, to the crankshaft of which the compressor is directly coupled.

There are now readily available high speed diesel engines, that is to say diesel engines operating with crankshaft speeds up to 3000 r.p.m. or more, and thus developing a comparatively high power output for their size, and one of the objects of the invention is to provide an air compressor suitable for coupling direct to the crankshaft of such a high speed diesel engine so as to provide a compact and comparatively light air compressing unit.

A reciprocating air compressor according to the present invention includes at least one working cylinder having a combined inlet and outlet port communicating with each end of its bore, a double-acting working piston disposed within the cylinder and connected to a crankshaft so as to be reciprocated thereby, a reciprocating piston valve arranged to reciprocate within a valve bore (hereinafter called the "valve cylinder") which extends lengthwise of and lies adjacent to the working cylinder bore and into which open the combined inlet and outlet ports, and a connection between the crankshaft and the piston valve whereby the piston valve is caused to reciprocate once per crankshaft revolution, the valve cylinder communicating with inlet and delivery passages and the piston valve being formed so that it connects each of the combined inlet and outlet ports alternately to the inlet and delivery passages to allow fresh air to pass into and compressed air to be delivered from each end of the working cylinder by movement of the working piston.

Where an air compressor according to the invention is of the two-stage type it may have a first low pressure stage comprising a working cylinder containing a double-acting working piston, and having an associated piston valve all arranged and operating in the manner indicated above, the delivery passage of this first stage leading to or constituting the inlet passage of a second higher pressure stage, comprising a working cylinder containing a second stage working piston connected for reciprocation to the crankshaft, and a second stage piston valve also connected for reciprocation to the crankshaft and controlling the inlet port or ports of the second stage working cylinder. In this case the delivery port or ports of the second stage may either also be controlled by the piston valve, or may be controlled by an automatic valve or valves, for example of the disc or poppet type. Moreover where the delivery port or ports of said second stage are controlled by one or more automatic valves, the automatic valve or each of the automatic valves may be constructed and arranged so that, as the poppet valve opens, it enters the mouth of a pocket in the delivery passage formed so that a restricted passage remains for the escape of air from such pocket, whereby air is compressed in the pocket and some air is ejected from the pocket during opening of the valve and the acceleration of the valve as it returns to its seating is damped or checked during its initial movement by the depression created in the pocket.

Where the air compressor is of the two-stage type the axis of the cylinder of the second stage may conveniently be disposed with its axis displaced by approximately 90° about the crankshaft axis, from the axis of the first stage cylinder the first and second stage pistons being connected to the same crank pin on the crankshaft while the piston valve or valves are operated from a further crank pin on the crankshaft.

Figure 4:
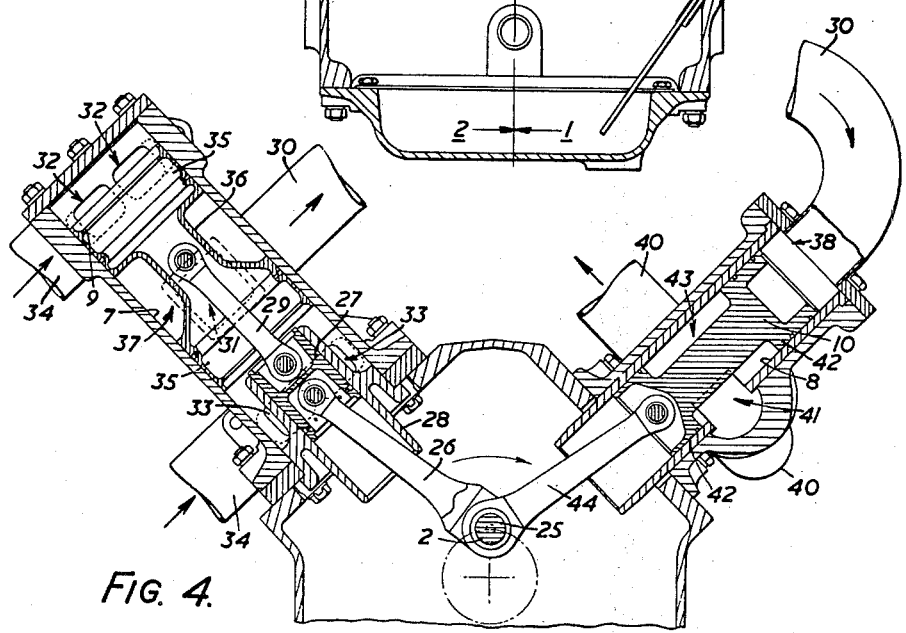
Figure 5:
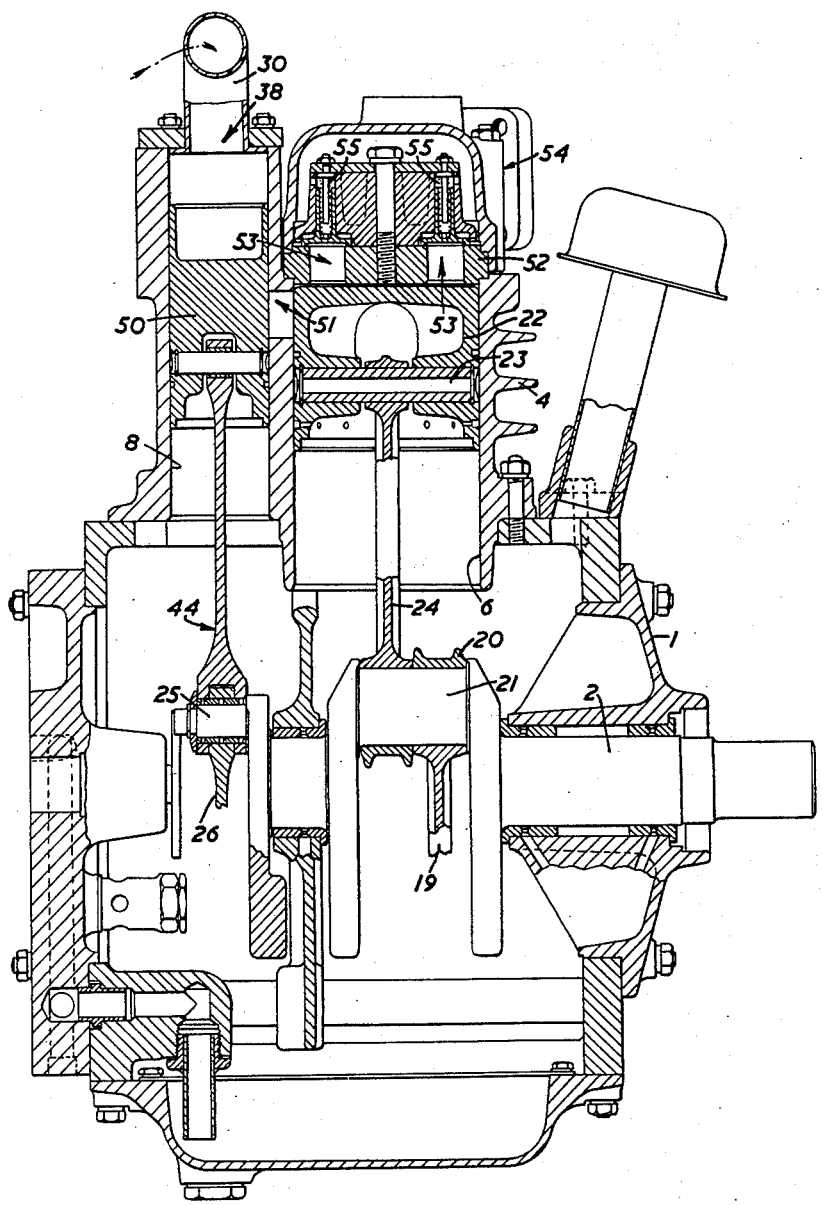

The invention may be performed in various ways but one embodiment and a modification thereof will now be described by way of example with reference to the accompanying drawing in which:

FIGURE 1 is a cross-sectional view on the line 1—1 of FIGURE 3 of the first stage working cylinder and its associated piston valve of a two stage compressor embodying the invention, FIGURE 2 is a cross-sectional view of the second stage cylinder and piston valve on the line 2—2 of FIGURE 3 of the same compressor, FIGURE 3 is a cross-sectional view on the line 3—3 of FIGURES 1 and 2 of the working cylinders of the compressor, FIGURE 4 is a cross-sectional view on the line 4—4 of the piston valves of the compressor and FIGURE 5 is a cross-sectional view of a second stage working cylinder and piston valve similar to FIGURE 2 but showing a modified outlet valve arrangement.

As shown in FIGURES 1, 2, 3 and 4 of the drawings the compressor comprises a crank case 1 in which is supported a crankshaft 2 and on which are mounted two cylinder blocks 3 and 4 containing respectively first and second stage working cylinders 5 and 6, and formed with bores 7 and 8 constituting cylinders for first and second stage piston valves 9 and 10 associated with the working cylinders 5 and 6. The cylinder for the piston valve associated with each working cylinder lies parallel and close to the bore of its working cylinder and the cylinder blocks 3 and 4 are so disposed that the axes of the working cylinders 5 and 6 are displaced by 90° about the axis of the crankshaft 2.

The end of the first stage working cylinder 5 remote from the crank case 1 is provided with a combined inlet and outlet port 11 leading through the wall of the associated valve cylinder 7 while the other end of the first stage working cylinder is "closed" by an annular "head" 12 having a tubular bore 13 coaxial with but of smaller diameter than the bore of the working cylinder. A second combined inlet and outlet port 14 leads from the end of the bore of the working cylinder 5 adjacent to this head 12 into the associated valve cylinder 7.

Arranged to reciprocate within the first stage working cylinder 5 is a truncated piston 15 the smaller diameter part 16 of which operates within the tubular bore 13 referred to so that the piston is of the double-acting type, the working chamber remote from the crankshaft having an effective cross-sectional area equal to that of the working cylinder 5 while the other is constituted by the annular chamber between the under face of the piston 15 and the "head" 12 referred to. The full diameter part of the piston 15 and the part 16 which operates within the tubular bore in the 'head" 12 are provided with appropriate sealing rings and the tubular part 16 is provided with budgeon pin bosses 17 of usual form to receive the ends of a gudgeon pin 18 by which one end of a connecting rod 19 is connected to the piston. The other end of the connecting rod 19 is connected by the usual big end bearing 20 to a crank pin 21 on the crankshaft 2.

The second stage working cylinder 6 contains a piston 22 of normal single-acting type which is connected by a gudgeon pin 23 and connecting rod 24 to the same crank on the crankshaft 2, the big end bearings of the two connecting rods lying side by side on the crank pin 21.

Also provided on the crankshaft 2 is a subsidiary crank pin 25 for operating the piston valves 9 and 10 in the two piston valve bores 7 and 8. The piston valve 9 in the valve cylinder 7 associated with the double-acting first stage cylinder 5 is operated by a connecting rod 26 from the subsidiary crank pin 25 through an externally cylindrical cross-head 27 sliding in a bore in a tubular cross-head guide 28 secured to the crank case 1, so that the piston valve 9, which is connected to the cross-head 27 by a further connecting rod 29 shall be free from side loads from the subsidiary crank pin 25. The tubular cross-head 27 closes the end of the piston valve cylinder 7 adjacent to the crankshaft 2 at a point below that at which the combined inlet and outlet port 14 at the crankshaft end of the first stage working cylinder 5 enters the cylinder 7. A first stage delivery passage 30 communicates with the valve cylinder 7 by a delivery port 31 situated at a point in the length of the valve cylinder 7 approximately midway between the two combined inlet and outlet ports 11 and 14.

Opening into the ends of the valve cylinder 7 at points beyond the combined inlet and outlet ports 11 and 14 are inlet ports 32, 33 which communicate with the atmosphere through ducts 34. For lightness and convenience the valve 9 is conveniently hollow and comprises two hollow tubular end portions 35 which make sealing engagement with the valve cylinder, as by means of sealing rings, and an intermediate portion 36, which is also of hollow tubular form but of smaller diameter than the end portions such that any air flow through it is restricted. The intermediate portion thus provides an external circumferential delivery recess 37.

The arrangement is such that during reciprocation of the first stage working piston 15 and its associated piston valve 9 each of the combined inlet and outlet ports 11 and 14 is uncovered by the adjacent end of the piston valve 9 during the suction period of the adjacent working chamber, and each of such combined inlet and outlet ports 11 and 14 is connected through the circumferential delivery recess 37 in the valve 9 to the first stage delivery passage 30 during the delivery period of the associated working chamber. The first stage delivery passage 30 leads, for example by way of an inter-cooler (not shown), to a second stage inlet port 38 at the outer end of the valve cylinder 8 of the second stage.

The outer end of the working cylinder 6 of the second stage has a combined inlet and outlet port 39 opening into the second stage valve cylinder 8, and in this cylinder lies and reciprocates the second stage piston valve 10. A second stage delivery passage 40 communicates with the second stage valve cylinder 8 through a port 41 at a point nearer the crankshaft 2 than the second stage combined inlet and outlet port 39 and the second stage piston valve 10 has end portions 42 which make sealing contact with its associated cylinder 8 and is provided with a circumferential recess 43 between such end portions. The arrangement is such that the outer end of the second stage piston valve 10 uncovers the second stage combined inlet and outlet port 39 during the inlet period of the second stage working piston 22 and brings such combined inlet and outlet port into communication, through the circumferential recess 43 in the second stage piston valve 10, with the second stage delivery passage 40 during the delivery period of the second stage working piston. The second stage piston valve 10 in the above arrangement is operated through a connecting rod 44 from the subsidiary crank pin 25 the big ends of the two piston valve connecting rods 26 and 44 which operate the two piston valves lying side by side on the subsidiary crank pin 25.

In a modified form of compressor according to the invention as shown in FIGURE 5 in which the same reference numerals are used for similar parts the second stage piston valve is in the form of a simple piston member 50 which serves only as an inlet valve to uncover a second stage transfer inlet port 51 during the inlet periods of that stage. The head 52 of the second stage working cylinder is provided with delivery ports 52, communicating with a second stage delivery passage 54 through automatic poppet type valves 55.

In this arrangement the piston valve 50 operates to open the transfer port 51 so that it communicates with the inlet port 38 at the appropriate time in the operating cycle of the second stage working piston 22, and to close the port 51 as the piston rises so that the compressed air is delivered through the delivery ports 53 past the valves 55 to the delivery passage 54.

What I claim as my invention and desire to secure by Letters Patent is:

1. A reciprocating air compressor having a lower pressure stage comprising a working cylinder having a working bore, a valve cylinder having a valve bore which extends lengthwise of and adjacent to said working bore, a double-acting working piston disposed within said working bore, and a reciprocating piston valve disposed within said valve bore, a crankshaft, an operative connection between said working piston and said crankshaft, an operative connection between said piston valve and said crankshaft to cause said piston valve to reciprocate in said valve bore once per crankshaft revolution, a combined inlet and outlet port communicating with each end of said working bore and opening into said valve bore, and inlet and delivery conduits communicating with said valve bore, each of said combined inlet and outlet ports being operatively connected alternately to said inlet and said delivery conduit by movement of said piston valve, and a second higher pressure stage comprising a higher pressure stage working cylinder having a higher pressure stage working cylinder bore, a higher pressure stage valve cylinder having a higher pressure stage valve bore, a higher pressure stage single-acting working piston disposed within said higher pressure stage working cylinder bore, an operative connection between said higher pressure stage working piston and said crankshaft, outlet means for delivery of air from said higher pressure stage working cylinder bore, a higher pressure stage piston valve disposed within said higher pressure stage valve bore, an inlet port being provided between said higher pressure stage working cylinder bore and said higher pressure stage valve bore while the delivery conduit from the said lower pressure stage leads to a higher pressure stage inlet conduit opening into said higher pressure stage valve bore, said crankshaft being provided with a plurality of crank pins, said working pistons in said lower pressure and higher pressure stage working cylinder bores being both connected to one of said crank pins on said crankshaft, and an operative connection between said higher pressure stage piston valve and said crankshaft to cause said higher pressure stage piston valve to connect said higher pressure stage inlet conduit to said higher pressure stage working bore at the appropriate period during each cycle of operations.

2. A reciprocating air compressor as claimed in claim 1 in which said second stage working cylinder bore is disposed with its axis displaced by approximately 90° about the axis of said crankshaft, from the axis of said lower pressure stage working cylinder bore.

3. A reciprocating air compressor as claimed in claim 2 in which both said lower pressure stage and higher pressure stage piston valves are operatively connected to another crank pin on said crankshaft.

4. A reciprocating air compressor as claimed in claim 3 in which said higher pressure stage working cylinder bore is provided with at least one delivery port which opens into said higher pressure stage valve bore, a higher pressure stage delivery conduit also opening into said higher pressure stage valve bore, and said port being operatively connected to said conduit by movement of said higher pressure stage piston valve.

5. A reciprocating air compressor as claimed in claim 1 in which said higher pressure stage working cylinder bore is provided with at least one delivery port which opens into said higher pressure stage valve bore, a higher pressure stage delivery conduit also opening into said higher pressure stage valve bore, and said port being operatively connected to said conduit by movement of said higher pressure stage piston valve.

6. A reciprocating air compressor as claimed in claim 5 in which said higher pressure stage working cylinder bore is disposed with its axis displaced by approximately 90° about the axis of said crankshaft, from the axis of said first stage working cylinder bore.

7. A reciprocating air compressor as claimed in claim 1 in which said outlet means comprises at least one delivery port and a valve of the poppet type.

8. A reciprocating air compressor as claimed in claim 7 in which said higher pressure stage working cylinder is disposed with its axis displaced by approximately 90° about the axis of said crankshaft from the axis of said lower pressure stage working cylinder bore.

9. A reciprocating air compressor as claimed in claim 3 in which said outlet means comprises at least one delivery port and a valve of the poppet type.

References Cited in the file of this patent

UNITED STATES PATENTS

| | | |
|---|---|---|
| 256,232 | Manning | Apr. 11, 1882 |
| 1,460,824 | Parsons | July 3, 1923 |